(12) United States Patent
Chen et al.

(10) Patent No.: US 11,331,762 B2
(45) Date of Patent: May 17, 2022

(54) METHOD FOR SYNCHRONOUS CONTROL OF GANTRY MECHANISM WITH ONLINE INERTIA MATCHING

(71) Applicant: Industrial Technology Research Institute, Hsin-Chu (TW)

(72) Inventors: Min-Rong Chen, Changhua County (TW); Shih-Chang Liang, Taichung (TW); Tsung-Yu Yang, Taichung (TW); Jun-Hong Guo, New Taipei (TW); Jih-Chieh Lee, Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 390 days.

(21) Appl. No.: 16/721,029

(22) Filed: Dec. 19, 2019

(65) Prior Publication Data

US 2021/0154789 A1 May 27, 2021

(30) Foreign Application Priority Data

Nov. 22, 2019 (TW) .................................. 108142580

(51) Int. Cl.
*B23Q 15/12* (2006.01)
*G05B 19/404* (2006.01)
(Continued)

(52) U.S. Cl.
CPC ............. *B23Q 15/12* (2013.01); *B23Q 1/267* (2013.01); *B23Q 1/626* (2013.01); *B25J 9/026* (2013.01); *G05B 19/404* (2013.01)

(58) Field of Classification Search
None
See application file for complete search history.

(56) References Cited

U.S. PATENT DOCUMENTS

| 4,658,485 A * | 4/1987 | Yang ..................... B23Q 1/012 |
| | | 451/340 |
| 5,917,300 A | 6/1999 | Tanquary et al. |

(Continued)

FOREIGN PATENT DOCUMENTS

| CN | 1925310 A | 3/2007 |
| CN | 100349080 C | 11/2007 |

(Continued)

OTHER PUBLICATIONS

N. Kamaldin et al., "A Novel Adaptive Jerk Control With Application to Large Workspace Tracking on a Flexure-Linked Dual-Drive Gantry," in IEEE Transactions on Industrial Electronics, vol. 66, No. 7, pp. 5353-5363, Jul. 2019. doi: 10.1109/TIE.2018.2870391.

(Continued)

*Primary Examiner* — Ryan A Jarrett
(74) *Attorney, Agent, or Firm* — WPAT, PC

(57) ABSTRACT

A method for synchronous control of a gantry mechanism with online inertia matching is applicable to a machine tool equipped with a gantry mechanism. The gantry mechanism includes two rails, a crossbeam and a saddle, in which the saddle is disposed on the crossbeam, and the crossbeam is disposed by crossing the two rails. Each of the two rails is furnished with a driving apparatus for synchronously driving the crossbeam, and the driving apparatus includes a drive motor and a lead screw. This method includes the steps of: obtaining gantry-mechanism information; detecting position information of the saddle on the crossbeam; evaluating the position information and the gantry-mechanism information to derive load-inertia variety information; and, evaluating the load-inertia variety information to adjust torque-output information of the drive motor corresponding to the respective driving apparatus.

4 Claims, 5 Drawing Sheets

(51) Int. Cl.
  *B23Q 1/62* (2006.01)
  *B25J 9/02* (2006.01)
  *B23Q 1/26* (2006.01)

(56) References Cited

U.S. PATENT DOCUMENTS

| | | | |
|---|---|---|---|
| 6,217,496 B1* | 4/2001 | Lindem | B23Q 11/005 483/30 |
| 6,246,203 B1 | 6/2001 | Abbott et al. | |
| 6,771,036 B2 | 8/2004 | Fujita | |
| 6,794,842 B2 | 9/2004 | Sano | |
| 2004/0090126 A1 | 5/2004 | Hsu et al. | |
| 2016/0231730 A1 | 8/2016 | Wakana | |
| 2017/0052526 A1 | 2/2017 | Yoshiura et al. | |
| 2017/0259315 A1* | 9/2017 | Liu | B23Q 1/626 |

FOREIGN PATENT DOCUMENTS

| | | |
|---|---|---|
| CN | 201054862 Y | 4/2008 |
| CN | 100470431 C | 3/2009 |
| CN | 102059573 A | 5/2011 |
| CN | 102710183 B | 10/2012 |
| CN | 102828845 A | 12/2012 |
| CN | 202701768 U | 1/2013 |
| CN | 108608219 A | 10/2018 |
| CN | 110091209 A | 8/2019 |
| CN | 110253308 A | 9/2019 |
| KR | 10-1729894 B1 | 4/2017 |
| TW | 201426229 A | 7/2014 |
| TW | I494725 | 8/2015 |
| TW | M585184 | 10/2019 |

OTHER PUBLICATIONS

B. Yao et al., "Adaptive Robust Precision Motion Control of a High-Speed Industrial Gantry With Cogging Force Compensations," in IEEE Transactions on Control Systems Technology, vol. 19, No. 5, pp. 1149-1159, Sep. 2011. doi: 10.1109/TCST.2010.2070504.

C.S.TEO et al. "Dynamic modeling and adaptive control of a H-type gantry stage" Mechatronics vol. 17, Issue 7, Sep. 2007, pp. 361-367. Accepted Apr. 2, 2007, Available online May 21, 2007. https://doi.org/10.1016/j.mechatronics.2007.04.004.

Chu et al. (2004). Optimal Cross-Coupled Synchronizing Control of Dual-Drive Gantry System for a SMD Assembly Machine. Jsme International Journal Series C-mechanical Systems Machine Elements and Manufacturing—Jsme Int J C. 47. 939-945. 10.1299/jsmec.47.939.

P. Li et al., "Synchronization control of dual-drive system in gantry-type machine tools based on disturbance observer," 2016 12th IEEE/ASME International Conference on Mechatronic and Embedded Systems and Applications (MESA), Auckland, 2016, pp. 1-7. doi: 10.1109/MESA.2016.7587162.

Zhao Ximei et al., "Synchronous Control of Gantry Moving Type Boring-Milling Machining Centers Based-on Disturbance Observer," 2005 International Conference on Electrical Machines and Systems, Nanjing, 2005, pp. 1573-1575. doi: 10.1109/ICEMS.2005.202814.
TW OA issued on Nov. 30, 2020.
CN OA issued on Nov. 1, 2021.

\* cited by examiner

METHOD FOR SYNCHRONOUS CONTROL OF GANTRY MECHANISM WITH ONLINE INERTIA MATCHING

CROSS REFERENCE TO RELATED APPLICATION

This application claims the benefits of Taiwan application Serial No. 108142580, filed on Nov. 22, 2019, the disclosures of which are incorporated by references herein in its entirety.

TECHNICAL FIELD

The present disclosure relates in general to a synchronous control method of online inertia matching, and more particularly to a method for synchronous control of a gantry mechanism with online inertia matching applied to a sliding double-column machine tool.

BACKGROUND

Currently, the conventional sliding double-column machine tool is equipped with a gantry mechanism that is typically consisted of two parallel rails, two columns and an X-axis crossbeam or cross-rail, in which the X-axis crossbeam is supported in a cross manner by the two columns, and thus crossing the two rails. The X-axis crossbeam is furnished with a saddle to slide along an X axis, and the saddle includes generally a spindle and a Z-axis headstock. Each of the rails is equipped with an actuator such as a drive motor or a lead screw, for moving the X-axis crossbeam, the columns and the saddle in a Y-axis direction.

Since the spindle and the Z-axis headstock of the saddle are both large and heavy, and also since the two parallel rails shall carry weights of the columns, the X-axis crossbeam and the saddle, thus, only particularly when the saddle is positioned at a middle position of the X-axis crossbeam, the two rails can equally share load inertia of the drive motor. Namely, at this middle position, position difference of the gantry mechanism can be usually controlled within an acceptable deviation range. However, for example, as the saddle moves to a side of the X-axis crossbeam, distribution of inertia loading to the gantry mechanism would vary. At this time, if this distribution is not relevantly adjusted, output torques and accelerations of the two drive motors would not catch or match the variation of the practical load-inertia. Thereupon, unacceptable position difference at the X-axis crossbeam over the two rails would be induced, and an unexpected damage would occur highly possibly to the gantry mechanism.

Thus, an effort to provide a method for synchronous control of a gantry mechanism with online inertia matching that can overcome the aforesaid shortcomings is definitely urgent in the art.

SUMMARY

An object of the present disclosure is to provide a method for synchronous control of a gantry mechanism with online inertia matching, which can provide more precise output torque and acceleration by adjusting inertia-ratio parameters of individual drive motors of the corresponding rails. Thereupon, variation of inertia loading at the crossbeam while the saddle is not equally supported can be relevantly compensated, position difference of the gantry mechanism can be controlled within an acceptable range, and advantages from inertia matching can be simultaneously obtained.

In one embodiment of this disclosure, a method for synchronous control of a gantry mechanism with online inertia matching is applicable to a machine tool equipped with a gantry mechanism. The gantry mechanism includes two rails, a crossbeam and a saddle, in which the saddle is disposed on the crossbeam, and the crossbeam is disposed by crossing the two rails. Each of the two rails is furnished with a driving apparatus for synchronously driving the crossbeam, and the driving apparatus includes a drive motor and a lead screw. This method includes the steps of: obtaining gantry-mechanism information; detecting position information of the saddle on the crossbeam; evaluating the position information and the gantry-mechanism information to derive load-inertia variety information; and, evaluating the load-inertia variety information to adjust torque-output information of the drive motor corresponding to the respective driving apparatus.

As stated above, by providing the method for synchronous control of a gantry mechanism with online inertia matching of this disclosure, the position information of the saddle at the crossbeam is evaluated to obtain the load-inertia variety information of the two respective driving apparatus, and further the inertia-ratio parameter information can be derived, such that thereby the real-time torque-output information for the two drive motors can be obtained for matching inertia loading at the gantry mechanism.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
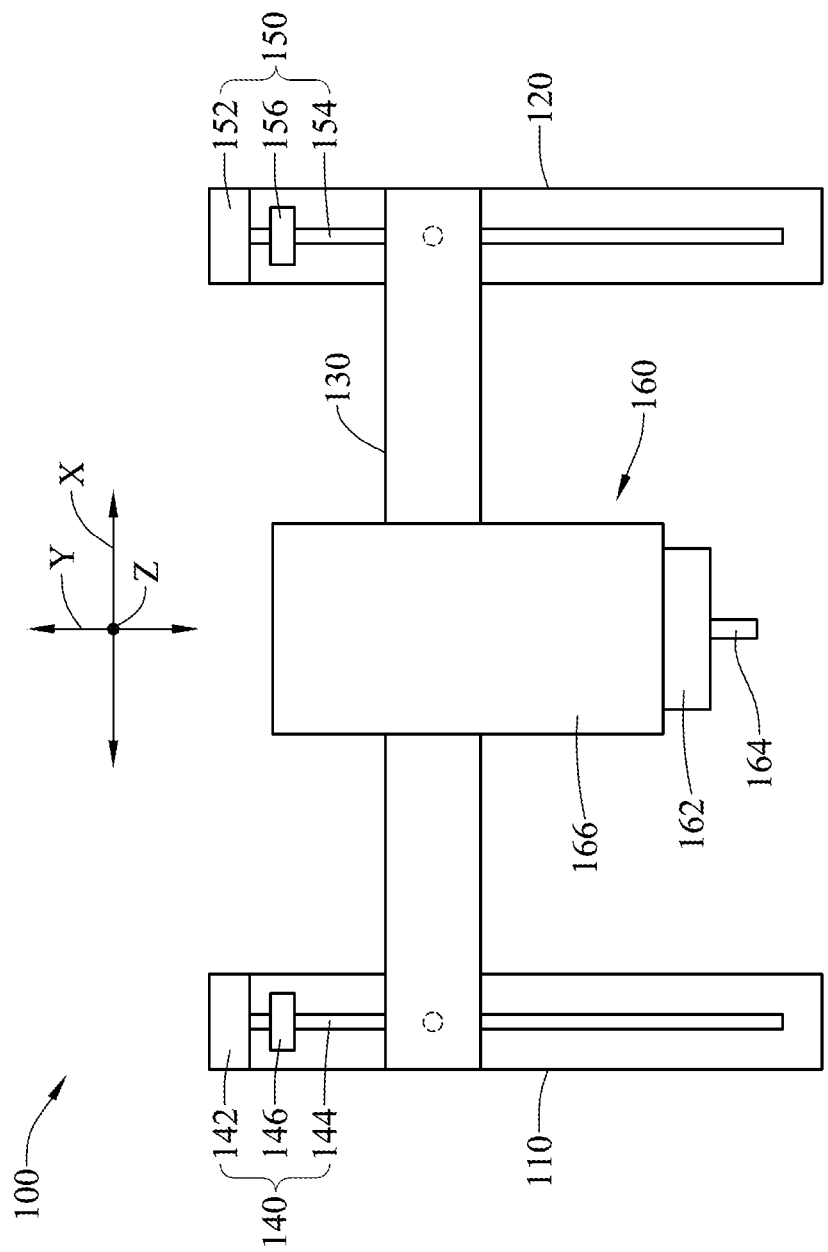
FIG. 1 is a schematic top view of a typical gantry mechanism in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a schematic top view of a typical gantry mechanism in accordance with this disclosure is shown. The gantry mechanism 100, generally applied to a sliding double-column machine tool not shown herein, can include a first rail 110 and a second rail 120 parallel to the first rail 110, a crossbeam 130 (an X-axis crossbeam for example), a first driving apparatus 140, a second driving apparatus 150 and a saddle 160. The first rail 110 and the second rail 120 are mounted by the first driving apparatus 140 and the second driving apparatus 150, respectively. Two opposing ends of the crossbeam 130 (including one beam shown herein, and may be two in other embodiments not shown herein) are disposed at the first rail 110 and the second rail 120, respectively. In some machine tools, the aforesaid crossbeam 130 can be also called as an X-axis crossbeam or a Y-axis crossbeam, and the difference in terminology shall not limit the scope of this disclosure.

In this embodiment, the saddle 160 is disposed on the crossbeam 130 to slide along the crossbeam 130, i.e., in a first direction X (namely, the X axis). The first driving apparatus 140 and the second driving apparatus 150 drive synchronously the crossbeam 130, such that the crossbeam 130 and the saddle 160 can displace together in a second direction Y (namely, the Y axis). In detail, the first driving apparatus 140 includes a first drive motor 142 (consisted of an actuator and a motor), a first lead screw 144 and a first shaft coupling 146 (or a decelerator). The first drive motor 142 utilizes the first shaft coupling 146 to connect and thus rotate the first lead screw 144. Similarly, the second driving apparatus 150 includes the second drive motor 152 (consisted of another actuator and another motor), a second lead screw 154 and a second shaft coupling 156 (or another decelerator). The second drive motor 152 utilizes the second shaft coupling 156 to connect and thus rotate the second lead screw 154. In addition, the saddle 160 includes a spindle 162, a cutter 164 (including cutter seat) and a Z-axis headstock 166. The cutter 164 is installed onto the spindle 162, and the Z-axis headstock 166 connecting the spindle 162 is located on the crossbeam 130, such that the spindle 162 can slide along the crossbeam 130 in a third direction Z (namely, the Z axis) through the Z-axis headstock 166. In other words, the gantry mechanism 100 of this embodiment is equipped with a three-axis driving mechanism.

Figure 2:
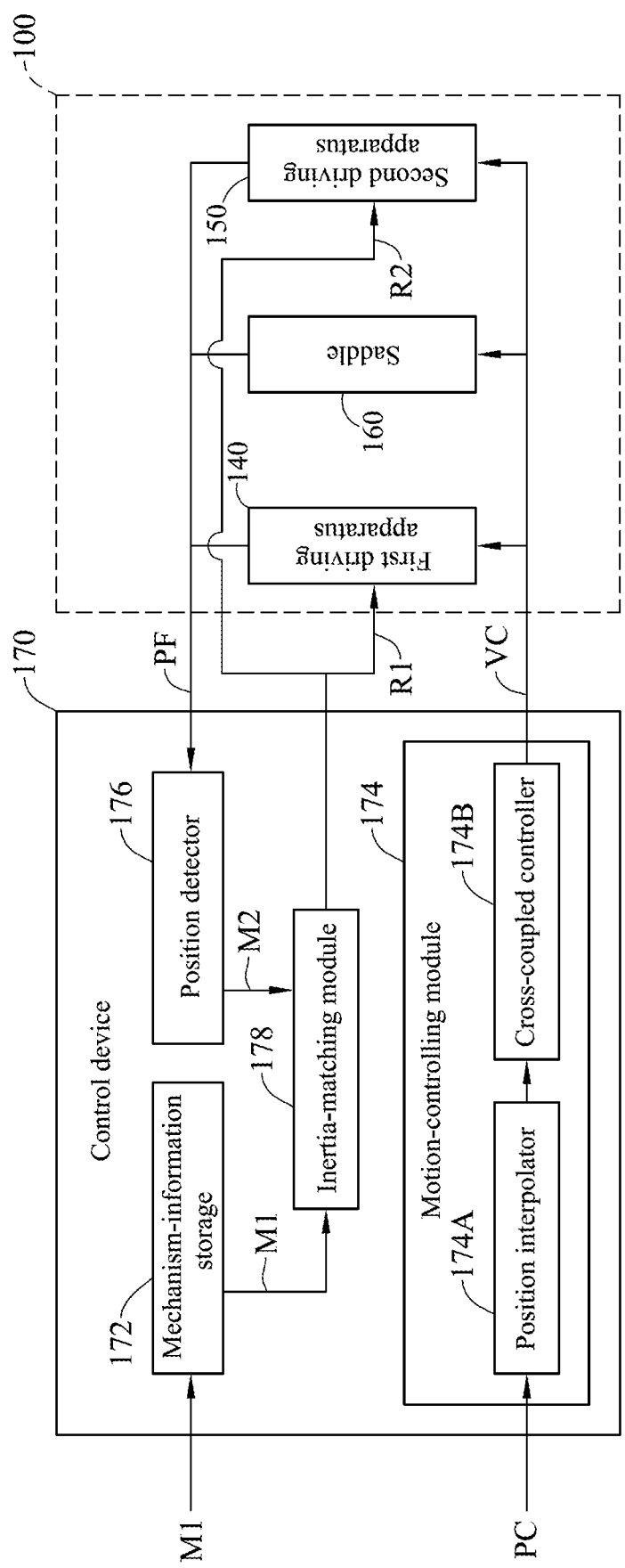
FIG. 2 demonstrates schematically a system framework of a control device in accordance with this disclosure.

Referring to FIG. 2, a system framework of a control device in accordance with this disclosure is demonstrated schematically. As shown, a control device 170 is introduced to synchronously control the first driving apparatus 140 and the second driving apparatus 150 so as to have the crossbeam 130 to move in the second direction Y (i.e., the Y axis), and to control the third driving apparatus (not shown in the figure) to drive the saddle 160 to displace along the crossbeam 130 in the first direction X (i.e., the X axis).

In detail, the control device 170 includes a mechanism-information storage 172, a motion-controlling module 174 and a position detector 176. The mechanism-information storage 172 is used for storing at least gantry-mechanism information M1. In this disclosure, the gantry-mechanism information M1 includes a mass of the saddle 160; a mass and a length of the crossbeam 130 (including all the columns); masses, pitches, densities, diameters and lengths of the individual lead screws (the first lead screw 144 and the second lead screw 154); and, load-inertia information of the individual drive motors (the first drive motor 142 and the second drive motor 152).

The motion-controlling module 174 includes a position interpolator 174A and a cross-coupled controller 174B. In this embodiment, a position command PC and a position interpolator 174A are input for performing interpolation. The position command PC includes relative position information between the crossbeam 130 and the saddle 160, and the cross-coupled controller 174B is introduced to perform necessary calculations so as to obtain velocity commands VC for the crossbeam 130 and the saddle 160, and further to control the first driving apparatus 140, the second driving apparatus 150 and the saddle 160 (via the third driving apparatus). In addition, the position detector 176 is used for detecting the position of the saddle 160 on the crossbeam 130.

Particularly, the control device 170 of this embodiment further includes an inertia-matching module 178 connected with the mechanism-information storage 172 and the position detector 176. The mechanism-information storage 172 is used for storing and transmitting the gantry-mechanism information M1 to the inertia-matching module 178. The position detector 176 can obtain the position information M2 of the saddle 160 on the crossbeam 130 via a position-feedback command PF, and the position information M2 is further transmitted to the inertia-matching module 178. The inertia-matching module 178 can evaluate the gantry-mechanism information M1 and the position information M2 to determine inertia-ratio parameter information R1, R2 corresponding for the first drive motor 142 and the second drive motor 152, respectively. Thereupon, inertia matching for the two drive motors can be obtained. In the following description, referring to FIG. 3, calculation of inertia-ratio parameter information for individual drive motor would be demonstrated.

Figure 3:
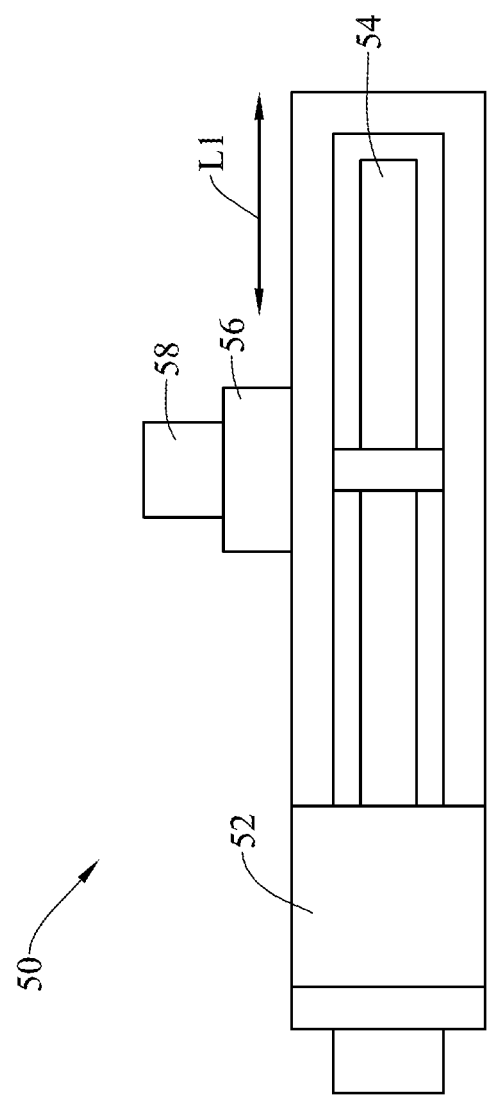
FIG. 3 is a schematic side view of a driving apparatus in accordance with this disclosure.

Referring to FIG. 3, a schematic side view of the driving apparatus in accordance with this disclosure is shown for elucidating how the first driving apparatus 140 and the second driving apparatus 150 drive synchronously the crossbeam 130 to displace. The driving apparatus 50 (either the first driving apparatus 140 or the second driving apparatus 150) includes a drive motor 52 (either the first drive motor 142 or the second drive motor 152) and a lead screw 54 (either the first lead screw 144 or the second lead screw 154), in which the drive motor 52 connects and thus drives the lead screw 54 (via a shaft coupling or a decelerator), the crossbeam 56 (either the crossbeam 130 or the crossbeam 130 further including columns), the saddle 58 (either the saddle 160 or the saddle 160 further including the spindle and the Z-axis headstock) disposed on the crossbeam 56. The drive motor 52 rotates the lead screw 54 to displace the crossbeam 56 and the saddle 58 in an axial direction L1 (i.e., the Y-axis direction. The driving apparatus 50 is fixed at a rail of the machine tool.

Upon such an arrangement, load-inertia information $J_{La}$ (kg·m$^2$) of a moving object (may including the saddle 58, the crossbeam 56 and other parts) can be expressed by equation (1) as follows:

$$J_{La} = m \times \left(\frac{p}{2\pi}\right)^2 \qquad (1)$$

In the foregoing equation (1), m stands for a mass (kg) of the moving object, and p stands for a displacement per revolution (m/rev) of the drive motor 52. Thus, it can be understood that the load-inertia information $J_{La}$ of the moving object is related to the mass of the moving object.

In addition, the total load-inertia information $J_L$(kg·m$^2$) of the driving apparatus 50 can be expressed by equation (2) as follows:

$$J_L = J_{La} + J_{Lb} \qquad (2)$$

In equation (2), the total load-inertia information $J_L$ of the driving apparatus 50 is the sum of the load-inertia information $J_{La}$ of the moving object and the load-inertia information $J_{Lb}$ of the lead screw 54, in which the load-inertia information $J_{Lb}$ of the lead screw 54 is related to the density, diameter and length of the lead screw 54.

Then, the inertia-ratio parameter information R (%) of the drive motor 52 of the driving apparatus 50 can be derived by equation (3) as follows:

$$R = \frac{J_L}{J_m} \times 100\% \tag{3}$$

in which $J_m$ is the rotor-inertia information of motor's rotor. In equation (3), the inertia-ratio parameter information R of the drive motor 52 is the ratio of the total load-inertia information $J_L$ of the driving apparatus 50 to the rotor-inertia information $J_m$ of the drive motor 52.

Figure 4:
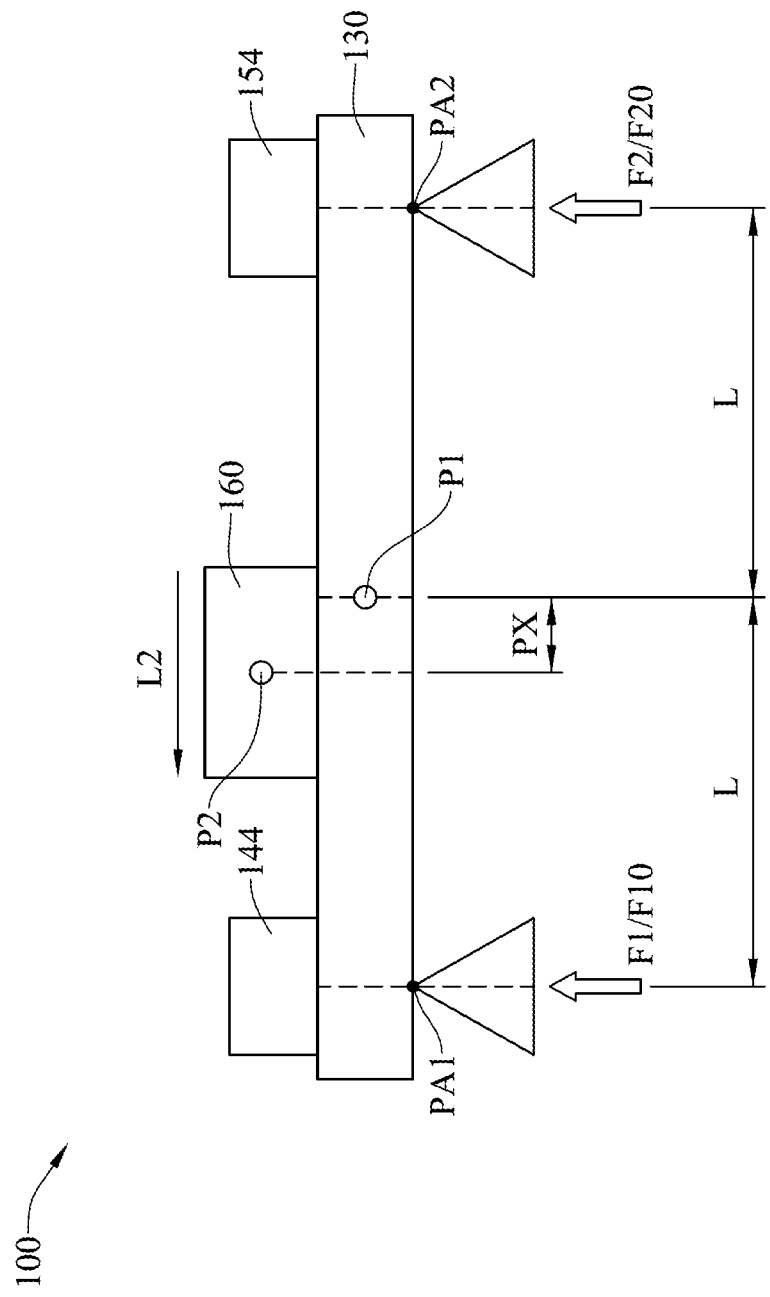
FIG. 4 is a schematic view showing relative positions of the saddle in accordance with this disclosure.

As described, from equation (1) to equation (3), it is known that the inertia-ratio parameter information R of the drive motor 52 of the driving apparatus 50 would vary with the change in mass of the moving object. In the following description, FIG. 4 is used for explaining how the inertia-ratio parameter information of the first driving apparatus 140 and the second driving apparatus 150 can be calculated. Referring to FIG. 4, a schematic view showing relative positions of the saddle in accordance with this disclosure is shown. The force balance and moment balance among the saddle 160, the first lead screw 144 and the second lead screw 154 on the crossbeam 130 can be computed by equation (4) and equation (5), respectively, as follows:

$$F1+F2=2m_3g+m_2g+m_1g \tag{4}$$

$$F1(2L)=m_3g(2L)+m_2g(L+PX)+m_1gL \tag{5}$$

The aforesaid equation (4) stands for an equation of forces at the first pivot PA1, in which F1 is the bearing force (N) at the first pivot PA1, F2 is the bearing force (N) at the second pivot PA2, $m_3$ is the mass of the first lead screw 144 or the second lead screw 154, $m_2$ is the mass of the saddle 160, and $m_1$ is the mass of the crossbeam 130. On the other hand, the aforesaid equation (5) stands for an equation of moment at the first pivot PA1, in which L is a distance between the first pivot PA1 and the mass-center position P1 of the crossbeam 130, or between the second pivot PA2 and the mass-center position P1 of the crossbeam 130. These two distances are the same as a constant. In this embodiment, the distance from the first pivot PA1 to the mass-center position P1 of the crossbeam 130 is set to be equal to that from the second pivot PA2 to the mass-center position P1 of the crossbeam 130. Namely, the length L is a half of the total length (2L) of the crossbeam 130. PX is the deviated distance between the mass-center position P2 of the saddle 160 and the mass-center position P1 of the crossbeam 130. If the deviated distance PX is zero, then it implies that the mass-center position P2 of the saddle 160 and the mass-center position P1 of the crossbeam 130 are coincided, and the following equation (6) expresses this situation as:

$$F1=F2=m_3g+m_2g\tfrac{1}{2}+m_1g\tfrac{1}{2} \tag{6}$$

In the aforesaid equation (6), in the circumstance that the mass-center position P2 of the saddle 160 and the mass-center position P1 of the crossbeam 130 are coincided, the bearing force F1 at the first pivot PA1 is equal to the bearing force F2 at the second pivot PA2.

On the other hand, if the deviated distance PX is not identical to zero, then, referring to FIG. 4, it implies that the saddle 160 moves toward the first pivot PA1 in the moving direction L2, such that the mass-center position P2 of the saddle 160 is not coincided with the mass-center position P1 of the crossbeam 130. At this time, the equations of forces are expressed as follows:

$$F10 = m_3g + m_2g\frac{L+PX}{2L} + m_1g\frac{1}{2} \tag{7}$$

$$F20 = m_3g + m_2g\frac{L-PX}{2L} + m_1g\frac{1}{2} \tag{8}$$

From the aforesaid equation (7) and equation (8), since the saddle 160 moves toward the first pivot PA1 by a deviated distance PX, then the bearing force F10 (N) at the first pivot PA1 is increased, while the bearing force F20 (N) at the second pivot PA2 is decreased.

Then, by subtracting equation (6) from equation (7), equation (9) can be obtained as follows:

$$F10 - F1 = m_2g\frac{PX}{2L} = \Delta mg \tag{9}$$

$$\Delta m = m_2\frac{PX}{2L} \tag{10}$$

In equation (9) and equation (10), as long as the mass-center position P2 of the saddle 160 and the mass-center position P1 of the crossbeam 130 does not coincide, then equivalent mass-varying information $\Delta m$ would be generated. In other words, the equivalent mass-varying information $\Delta m$ would be related to changes of the mass $m_2$ of the saddle 160 and the deviated distance PX. In the above equations, L is the distance from the first pivot PA1 to the mass-center position P1 of the crossbeam 130, or the distance from the second pivot PA2 to the mass-center position P1 of the crossbeam 130.

According to the aforesaid equation (10), equation (7) and equation (8) are rewritten as equation (11) and equation (12), respectively, as follows:

$$F10=F1+\Delta mg=(m_T+\Delta m)g \tag{11}$$

$$F20=F1-\Delta mg=(m_T-\Delta m)g \tag{12}$$

In the aforesaid equation (11) and equation (12), $m_T=m_3+m_2\tfrac{1}{2}+m_1\tfrac{1}{2}$.

Thus, when the saddle 160 moves toward the first pivot PA1 along the crossbeam 130 by a deviated distance PX, the bearing force F10 at the first pivot PA1 would be increased by an equivalent mass-varying value $\Delta M$, and simultaneously the bearing force F20 at the second pivot PA2 would be decreased by the equivalent mass-varying value $\Delta m$. Accordingly, the aforesaid equation (1) can be rewritten as the following equation (13):

$$J_{La}^1 = (m_T \pm \Delta m) \times \left(\frac{P}{2\pi}\right)^2 \tag{13}$$

Equation (13) implies that, after the saddle 160 moves, an inertia load $J_{La}^1$ of the moving object taken by the pivot that is located closer to the saddle 160 (for example, the first pivot PA1 of FIG. 4) would increase, but the inertia load $J_{La}^1$ of the moving object taken by the pivot that is located farther to the saddle 160 (for example, the second pivot PA2 of FIG. 4) would decrease.

It is noted that the moving direction L2 of FIG. 4 is compared to the first direction X (i.e., the X axis) of FIG. 1. Referring to FIG. 1, the saddle 160 on the crossbeam 130 can slide there along in the first direction X (i.e., the X axis). As the position information of the saddle 160 on the crossbeam 130 varies, the corresponding load-inertia information would vary as well.

In this embodiment, after the position information of the saddle 160 varies (namely when the deviated distance PX is not zero), the total load-inertia information $J_L^1$ corresponding to the first driving apparatus 140 and the second driving apparatus 150 can be expressed by equation (14) as follows:

$$J_L^1 = J_{La}^1 + J_{Lb}^1 \quad (14)$$

In equation (14), the load-inertia information $J_L$, of the first lead screw 144 and the second lead screw 154 are constant. In other words, to estimate the total load-inertia information $J_L^1$ corresponding to the first driving apparatus 140 and the second driving apparatus 150, beside the mass $m_1$ of the crossbeam 130, the mass $m_2$ of the saddle 160, the mass $m_3$ of the first lead screw 144 and the mass $m_3$ of the second lead screw 154 in equation (13), the position information of the saddle 160 on the crossbeam 130 shall be realized, so that the equivalent mass-varying information (value) $\Delta m$ can be derived.

Then, after the saddle 160 is moved, the inertia-ratio parameter information R (%) of the drive motor 52 in equation (3) can be rewritten to equation (15) as follows:

$$R^1 = \frac{J_L^1}{J_m} \times 100\% \quad (15)$$

In equation (15), since the rotor-inertia information Jm of the drive motor 52 is constant, thus the total load-inertia information $J_L^1$ of the first driving apparatus 140 and the second driving apparatus 150 in equation (14) is only needed for deriving the inertia-ratio parameter information $R^1$ of the drive motor 52. Similarly, the inertia-ratio parameter information $R^1$ of the first drive motor 142 and the inertia-ratio parameter information $R^2$ of the second drive motor 152 can be derived.

Figure 5:
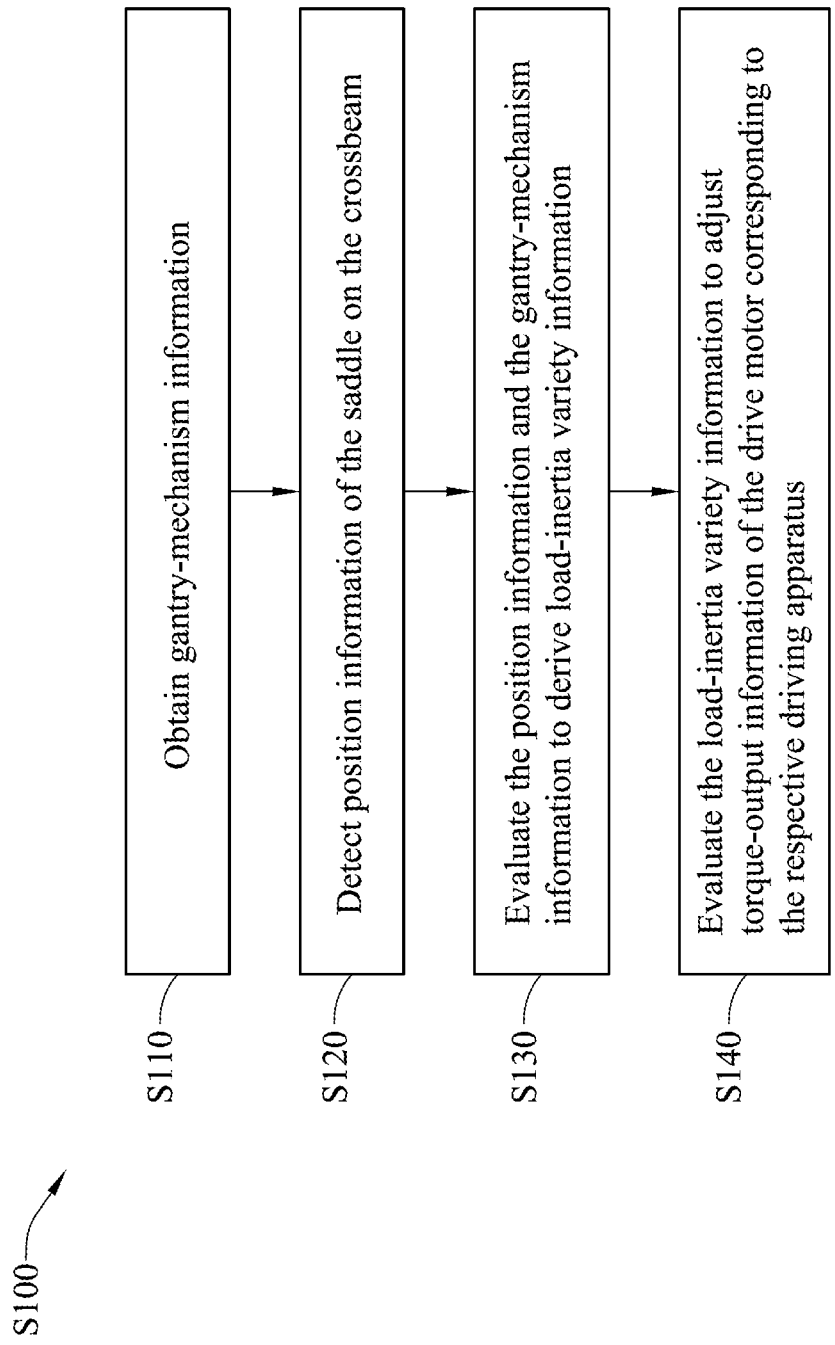
FIG. 5 is a flowchart of an embodiment of the method for synchronous control of a gantry mechanism with online inertia matching in accordance with this disclosure.

In the following description, FIG. 5 is used for elucidating the method for synchronous control of a gantry mechanism with online inertia matching in accordance with this disclosure. Referring also to FIG. 1 through FIG. 4, the method for synchronous control of a gantry mechanism with online inertia matching S100 includes Step S110 to Step S140 as follows. Firstly, Step S110 is performed to obtain gantry-mechanism information M, in which the gantry-mechanism information M1 includes a mass of the saddle 160, a mass of the crossbeam 130, and masses of individual lead screws (including the first lead screw 144 and the second lead screw 154). As shown in FIG. 2, a human-machine interface can be applied to setup or input the gantry-mechanism information M1, so that the gantry-mechanism information M1 can be stored into the mechanism-information storage 172. Then, the mechanism-information storage 172 further transmits the gantry-mechanism information M1 to the inertia-matching module 178.

Then, Step S120 is performed to detect the position information M2 of the saddle 160 on the crossbeam 130. For example, the position detector 176 of FIG. 2 is used to detect the position information M2 of the saddle 160 on the crossbeam 130. The position detector 176 then transmits the position information M2 to the inertia-matching module 178. Practically, Step S120 includes the following sub-steps. Firstly, as shown in FIG. 4, detect whether or not the mass-center position P2 of the saddle 160 is deviated from the mass-center position P1 of the crossbeam 130. If negative, it implies that the mass-center position P2 of the saddle 160 and the mass-center position P1 of the crossbeam 130 are coincided, and thus no change is needed upon the torque-output information for the first drive motor 142 and the second drive motor 152. On the other hand, if the mass-center position P2 of the saddle 160 is deviated from the mass-center position P1 of the crossbeam 130, then the position detector 176 can be used to derive the deviated distance PX between the mass-center position P2 of the saddle 160 and the mass-center position P1 of the crossbeam 130 so as to form the position information M2.

Then, Step S130 is performed to evaluate the position information M2 and the gantry-mechanism information M1, and so load-inertia variety information corresponding to the first driving apparatus 140 and the second driving apparatus 150 can be derived. In other words, after the saddle 160 on the crossbeam 130 displaces in the first direction X (i.e., the X axis), the load-inertia information would vary as the displacement changes.

Practically, Step S130 includes the following sub-steps. Firstly, the inertia-matching module 178 evaluates the position information M2 to derive the equivalent mass-varying information $\Delta m$. Then, by equation (13), the inertia-matching module 178 would evaluate the equivalent mass-varying information $\Delta m$ to derive the load-inertia information $J_{La}^1$. Then, by equation (14), the inertia-matching module 178 evaluates the load-inertia information $J_{La}^1$ and the load-inertia information $J_{Lb}$ of each of the lead screws (including the first lead screw 144 and the second lead screw 154) to calculate total load-inertia information $J_L^1$ corresponding to the first driving apparatus 140 and the second driving apparatus 150 so as to form the load-inertia variety information.

Then, Step S140 is performed to have the inertia-matching module 178 to evaluate each of the load-inertia variety information so as thereby to adjust the torque-output information corresponding to the first drive motor 142 and the second drive motor 152. Practically, Step S140 includes the following sub-steps. Firstly, by equation (15), the inertia-matching module 178 evaluates each of the load-inertia variety information and the rotor-inertia information of each of the drive motors (including the first drive motor 142 and the second drive motor 152) so as to compute the inertia-ratio parameter information R1, R2 of the first drive motor 142 and the second drive motor 152, respectively. The inertia-ratio parameter information R1, R2 are gain-function parameters for velocity control of the motor or actuator that affects the torque-output information of the drive motor. Thus, it is known that, according to this embodiment, the load-inertia variety information corresponding to the two driving apparatus can be directly obtained, and further the inertia-ratio parameter information R1, R2 of the two drive motors can be adjusted, by which more precise torque-output information and acceleration information can be obtained, and so that the load-inertia information of the saddle 160 can be matched to effectively reduce the position difference of the crossbeam 130 between the first rail 110 and the second rail 120. Thereupon, inertia matching of the gantry mechanism can be obtained.

In summary, by providing the method for synchronous control of a gantry mechanism with online inertia matching of this disclosure, the position information of the saddle at the crossbeam is evaluated to obtain the load-inertia variety information of the two respective driving apparatus, and further the inertia-ratio parameter information can be derived, such that thereby the real-time torque-output information for the two drive motors can be obtained for matching inertia loading at the gantry mechanism.

Further, in the art, the conventional technique utilizes the cross-coupled controller to match the torque difference so as to control the position difference of the saddle. It is realized that the torque and acceleration obtained by the conventional technique cannot match the load-inertia information of the saddle. Thus, substantial position difference across the crossbeam would be generated. On the other hand, by providing the method of this disclosure, the load-inertia variety information of the two driving apparatuses are directly or in-time adjusted, so that more accurate torque-output information and acceleration information for the drive motor can be obtained.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for synchronous control of a gantry mechanism with online inertia matching, applicable to a machine tool equipped with a gantry mechanism, the gantry mechanism including two rails, a crossbeam and a saddle, the saddle being disposed on the crossbeam, the crossbeam being disposed by crossing the two rails, each of the two rails being furnished with a driving apparatus for synchronously driving the crossbeam, the driving apparatus including a drive motor and a lead screw, the method for synchronous control of a gantry mechanism with online inertia matching comprising the steps of:

obtaining gantry-mechanism information, the gantry-mechanism information at least including a mass of the saddle, a mass of the crossbeam, and a mass of each of the lead screws;

detecting position information of the saddle on the crossbeam;

evaluating the position information and the gantry-mechanism information to derive load-inertia variety information; and evaluating the load-inertia variety information to adjust torque-output information of the drive motor corresponding to the respective driving apparatus.

2. The method for synchronous control of a gantry mechanism with online inertia matching of claim 1, wherein the step of "obtaining gantry-mechanism information" further includes the steps of:

detecting whether or not the mass-center position of the saddle is deviated from the mass-center position of the crossbeam; and if positive, obtaining a deviated distance between the mass-center position of the saddle and the mass-center position of the crossbeam so as to form the position information.

3. The method for synchronous control of gantry mechanism with online inertia matching of claim 1, wherein the step of "evaluating the position information and the gantry-mechanism information to derive load-inertia variety information" further includes the steps of:

evaluating the position information to derive equivalent mass-varying information;

evaluating the equivalent mass-varying information to derive load-inertia information; and evaluating the load-inertia information and load-inertia information of each of the lead screws to derive total load-inertia information corresponding to the driving apparatus to form the load-inertia variety information.

4. The method for synchronous control of gantry mechanism with online inertia matching of claim 1, wherein the step of "evaluating the load-inertia variety information to adjust torque-output information of the drive motor corresponding to the respective driving apparatus" further includes the step of:

evaluating the load-inertia variety information and rotor-inertia information of each of the drive motors to derive inertia-ratio parameter information of each of the two drive motors.

* * * * *